United States Patent
Kikuchi

(10) Patent No.: US 10,554,038 B2
(45) Date of Patent: Feb. 4, 2020

(54) INSULATED SYNCHRONOUS RECTIFICATION TYPE DC/DC CONVERTER, AND POWER ADAPTOR AND ELECTRONIC DEVICE

(71) Applicant: ROHM CO., LTD., Ukyo-ku, Kyoto (JP)

(72) Inventor: Hiroki Kikuchi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 291 days.

(21) Appl. No.: 15/620,069

(22) Filed: Jun. 12, 2017

(65) Prior Publication Data

US 2017/0365994 A1    Dec. 21, 2017

(30) Foreign Application Priority Data

Jun. 15, 2016   (JP) .................... 2016-119111

(51) Int. Cl.
| | |
|---|---|
| H02H 7/00 | (2006.01) |
| H02H 7/125 | (2006.01) |
| H02H 5/04 | (2006.01) |
| H02M 1/14 | (2006.01) |
| H02M 3/156 | (2006.01) |

(Continued)

(52) U.S. Cl.
CPC .............. *H02H 7/125* (2013.01); *H02H 5/04* (2013.01); *H02M 1/14* (2013.01); *H02M 3/156* (2013.01); *H02M 7/217* (2013.01); *H05B 37/0227* (2013.01)

(58) Field of Classification Search
CPC .......... H01F 27/40; H01F 27/24; H01F 27/28; H02M 7/003; H05K 1/14; H05K 2201/1003
See application file for complete search history.

(56) References Cited

U.S. PATENT DOCUMENTS

| | | | | |
|---|---|---|---|---|
| 2013/0076324 A1* | 3/2013 | Fujii | ...................... | B60R 16/03 |
| | | | | 323/276 |
| 2013/0279207 A1* | 10/2013 | Yu | ..................... | H02M 3/33507 |
| | | | | 363/21.06 |
| 2016/0359419 A1* | 12/2016 | Lin | ......................... | H02M 1/08 |

FOREIGN PATENT DOCUMENTS

JP    2008312335 A    12/2008

OTHER PUBLICATIONS

JP 2008-312335 English translation published on Dec. 25, 2008.*

* cited by examiner

*Primary Examiner* — Pete T Lee
(74) *Attorney, Agent, or Firm* — Cantor Colburn LLP

(57) ABSTRACT

An isolated synchronous rectification type DC/DC converter, includes: a transformer including primary and secondary windings; a switching transistor connected to the primary winding; a synchronous rectifying transistor installed between the secondary winding and a ground line on the secondary side; a photocoupler including a light emitting device and a light receiving device; a feedback circuit driving the light emitting device such that an output voltage of the DC/DC converter approaches a target voltage; a primary side controller connected to the light receiving device and switching the switching transistor depending on feedback signal from the photocoupler; a synchronous rectification controller controlling the rectifying transistor; and a protection circuit including a temperature detection element, one end of the detection element connected to a drain of the rectifying transistor, the protection circuit configured to detect an overheated state of the rectifying transistor depending on a first signal generated by the temperature detection element.

18 Claims, 12 Drawing Sheets

(51) Int. Cl.
*H02M 7/217* (2006.01)
*H05B 37/02* (2006.01)

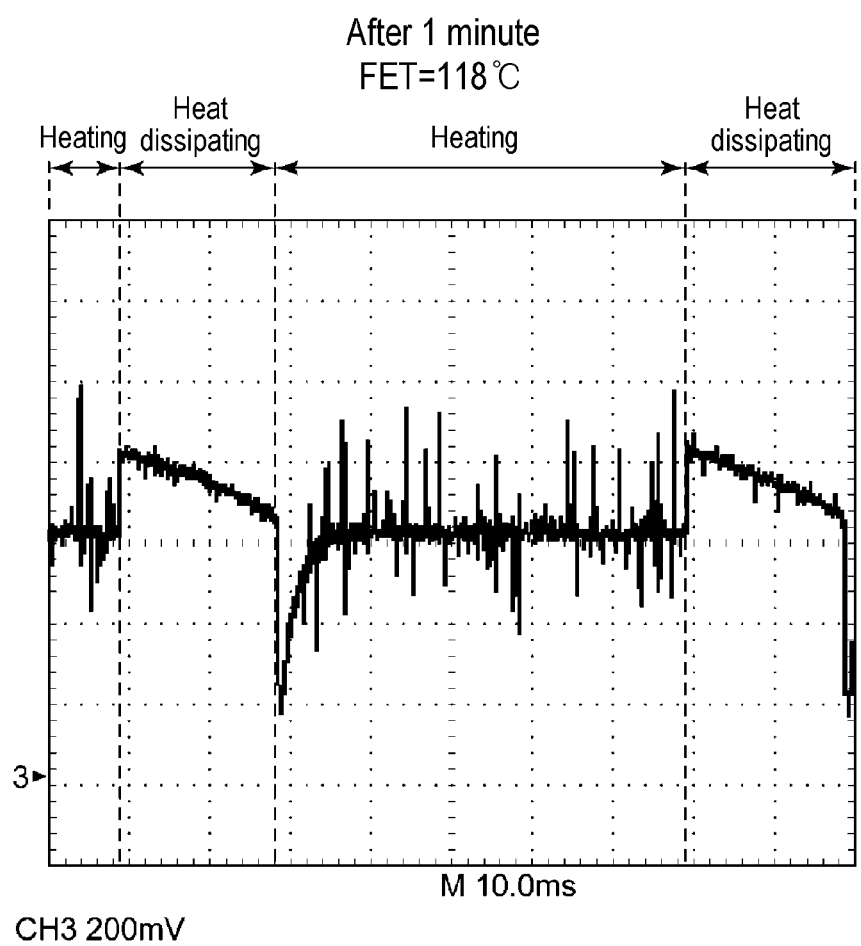

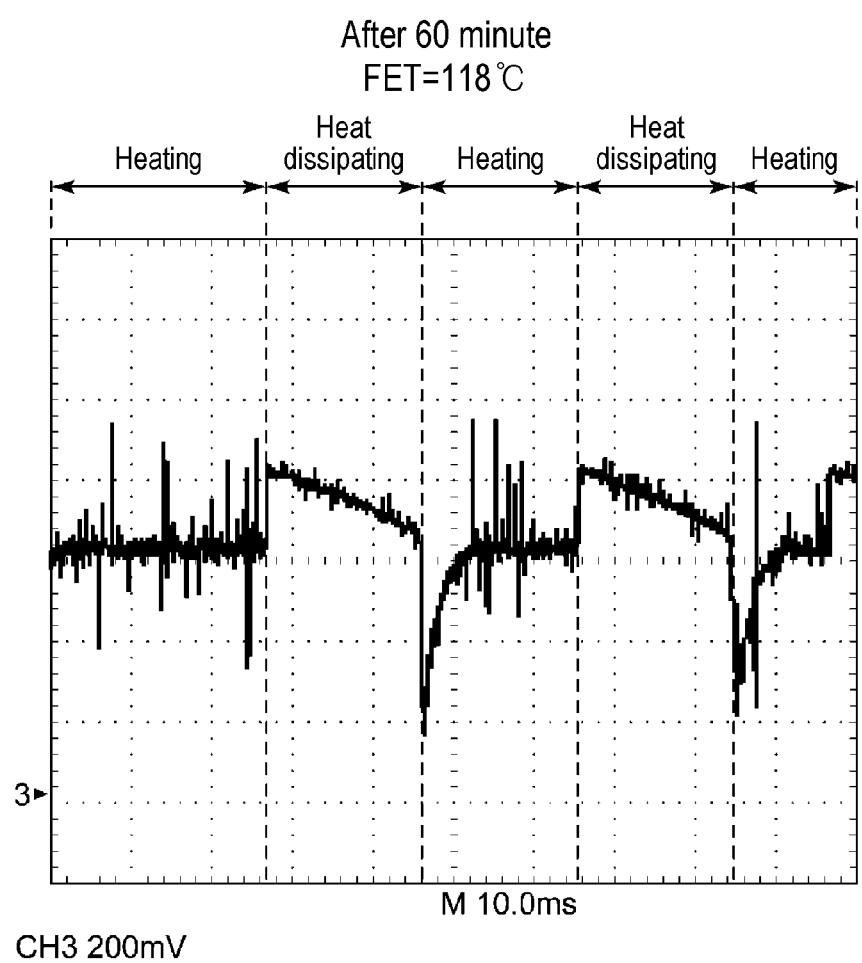

240a

240b

240c

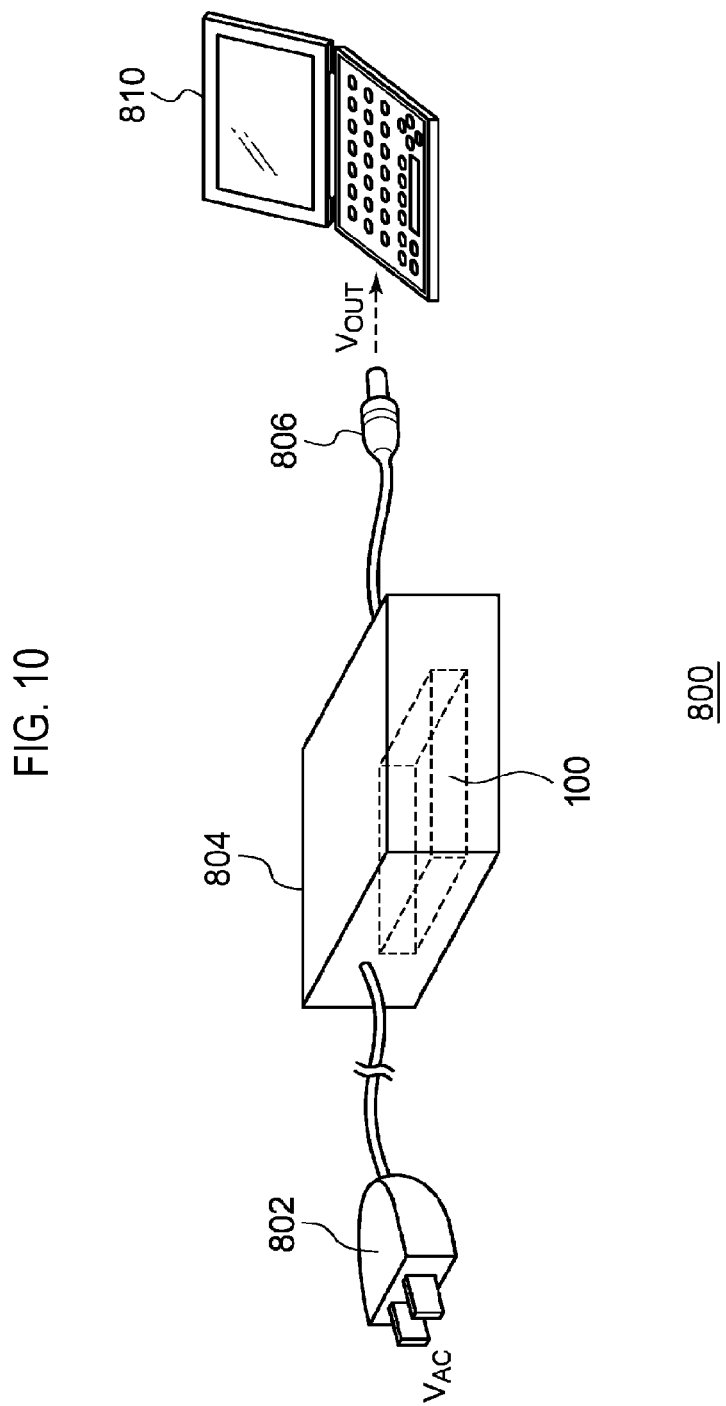

INSULATED SYNCHRONOUS RECTIFICATION TYPE DC/DC CONVERTER, AND POWER ADAPTOR AND ELECTRONIC DEVICE

CROSS-REFERENCE TO RELATED APPLICATION

The present invention claims priority under 35 U.S.C. § 119 to Japanese Patent Application No. 2016-119111, filed on Jun. 15, 2016, the entire contents of which are incorporated herein by reference.

TECHNICAL FIELD

The present disclosure relates to an insulated synchronous rectification type DC/DC converter.

BACKGROUND

Various home appliances such as TVs or refrigerators operate by receiving the commercial AC power from the outside. Electronic devices such as laptop computers, mobile phone terminals, or tablet terminals are also operable by a commercial AC power, or batteries built in devices are chargeable by the commercial AC power. A power supply device (AC/DC converter) that AC/DC-converts the commercial AC voltage is incorporated in such home appliances or electronic devices (hereinafter, generally referred to as "electronic devices"). Alternatively, the AC/DC converter may be incorporated in an external power adapter (AC adapter) of the electronic devices.

FIG. 1 is a block diagram illustrating a basic configuration of an AC/DC converter 100r reviewed by the present inventors. The AC/DC converter 100r largely includes a filter 102, a rectifier circuit 104, a smoothing capacitor 106, and an insulation type DC/DC converter 200r.

A commercial AC voltage $V_{AC}$ is input to the filter 102 via a fuse and an input capacitor (not shown). The filter 102 removes the noise of the commercial AC voltage $V_{AC}$. The rectifier circuit 104 is a diode bridge circuit that full-wave rectifies the commercial AC voltage $V_{AC}$. An output voltage of the rectifier circuit 104 is smoothed by the smoothing capacitor 106 and converted into a DC voltage $V_{IN}$.

The insulation type DC/DC converter 200r receives the DC voltage $V_{IN}$ by an input terminal P1, steps down the same, and supplies an output voltage $V_{OUT}$ stabilized to a target value to a load (not shown) connected to an output terminal P2.

The DC/DC converter 200r includes a primary side controller 202, a photocoupler 204, a feedback circuit 206, an output circuit 210, a synchronous rectification controller 300r, and other circuit components. The output circuit 210 includes a transformer T1, a diode D1, an output capacitor C1, a switching transistor M1, and a synchronous rectifying transistor M2. The topology of the output circuit 210 is the same as that of a general synchronous rectification type flyback converter, and thus, a description thereof will be omitted.

As the switching transistor M1 connected to a primary winding W1 of the transformer T1 is switched, the input voltage $V_{IN}$ is stepped down to generate the output voltage $V_{OUT}$. Further, the primary side controller 202 adjusts a duty ratio of switching of the switching transistor M1.

The output voltage $V_{OUT}$ of the DC/DC converter 200r is divided by resistors R1 and R2. The feedback circuit 206 includes, for example, a shunt regulator or an error amplifier; and amplifies an error between a divided voltage (voltage detection signal) Vs and a predetermined reference voltage $V_{REF}$ (not shown), generates an error current $I_{ERR}$ corresponding to the error, and draws (sink) it from a light emitting device (light emitting diode) on an input side of the photocoupler 204.

A feedback current $I_{FB}$ corresponding to the error current $I_{ERR}$ of the secondary side flows through a light receiving device (photo transistor) on the output side of the photocoupler 204. The feedback current $I_{FB}$ is smoothed by a resistor and a capacitor and input to a feedback (FB) terminal of the primary side controller 202. The primary side controller 202 adjusts a duty ratio of the switching transistor M1 based on a voltage (feedback voltage) $V_{FB}$ of the FB terminal.

The synchronous rectification controller 300r switches the synchronous rectifying transistor M2 in synchronization with the switching of the switching transistor M1. The synchronous rectification controller 300r includes a pulse generator 304 and a driver 306. The pulse generator 304 generates a pulse signal S1 synchronized with the switching of the switching transistor M1. For example, when the switching transistor M1 is turned off, the pulse generator 304 sets the pulse signal S1 to a first state (e.g., a high level) indicating ON of the synchronous rectifying transistor M2. Further, when the secondary current $I_S$ flowing through the secondary winding W2 becomes substantially zero during an ON period of the synchronous rectifying transistor M2, the synchronous rectification controller 300r sets the pulse signal S1 to a second state (a low level) indicating OFF of the synchronous rectifying transistor M2.

Since a voltage across the secondary winding W2 is $-V_{IN} \times N_S/N_P$ during the ON period of the switching transistor M1, a drain voltage $V_D$ (i.e., a drain-source voltage $V_{DS}$) of the synchronous rectifying transistor M2 becomes $V_D = V_{OUT} + V_{IN} \times N_S/N_P$. $N_P$ and $N_S$ are the numbers of turns of the primary winding W1 and the secondary winding W2, respectively.

When the switching transistor M1 is turned off, since the secondary current $I_S$ flows from the source of the synchronous rectifying transistor M2 to the drain thereof, the drain-source voltage becomes a negative voltage. In a continuous mode, as the switching transistor M1 is turned on, the secondary current $I_S$ becomes zero and the drain voltage again jumps to $V_D = V_{OUT} + V_{IN} \times N_S/N_P$. In a discontinuous mode, when the secondary current $I_S$ decreases as the energy stored in the transformer T1 decreases in the ON state of the synchronous rectifying transistor M2, an absolute value of the drain-source voltage $V_{DS}$ decreases, and when the secondary current $I_S$ eventually becomes substantially zero, the drain-source voltage $V_{DS}$ also becomes substantially zero and the drain voltage $V_D$ is ringing.

Using these properties, the pulse generator 304 generates the pulse signal S1 based on the drain voltage (the drain-source voltage) of the synchronous rectifying transistor M2.

The driver 306 switches the synchronous rectifying transistor M2 depending on the pulse signal S1. The above is the overall configuration of the AC/DC converter 100r.

It is assumed that the DC/DC converter 200r of FIG. 1 fails in a state in which the synchronous rectifying transistor M2 is turned off. Then, the secondary side circuit of the DC/DC converter 200r continues to operate as a diode rectifier circuit by a body diode of the synchronous rectifying transistor M2. Since a voltage drop of 0.7V is always generated in the body diode of the synchronous rectifying transistor M2, the synchronous rectifying transistor M2 abnormally generates heat.

FIG. 2 is a circuit diagram of a secondary side circuit 220r of the DC/DC converter 200r reviewed by the present inventors. The secondary side circuit 220r should not be recognized as a known technique.

The secondary side circuit 220r includes a thermistor 222 and a protection circuit 230, in addition to the secondary side circuit of FIG. 1. The thermistor 222 is installed to measure a package temperature of the synchronous rectifying transistor M2. One end of the thermistor 222 is connected to a connection line of the secondary winding W2 and the output capacitor C1, so that the DC voltage $V_{OUT}$ is applied as a DC bias voltage. A voltage drop corresponding to a temperature of the synchronous rectifying transistor M2 is generated in the thermistor 222. The protection circuit 230 detects an overheated state of the synchronous rectifying transistor M2 based on a voltage $V_{NTC}$ generated at the other end of the thermistor 222. Upon detecting the overheated state, the protection circuit 230 drives the light emitting diode of the photocoupler 204 with a large current. Thus, the feedback voltage $V_{FB}$ of the primary side becomes zero and the duty ratio of the switching transistor M1 becomes zero, namely the switching is stopped.

FIGS. 3A and 3B are diagrams illustrating layouts of the thermistor 222 and a package 224 of the synchronous rectifying transistor M2. In FIG. 3A, the thermistor 222 is mounted on a rear surface of a printed board 226 in which the package 224 of the synchronous rectifying transistor M2 is mounted on its surface. In FIG. 3A, since the printed board 226 has thermal resistance, it is difficult to say that the thermistor 222 can accurately measure even the temperature of the package 224, let alone the temperature of a field effect transistor (FET) in the package 224.

In FIG. 3B, a lead type thermistor 222 is densely mounted on a surface of the package 224 of the synchronous rectifying transistor M2. According to this layout, the temperature of the package 224 can be accurately measured, as compared with that of FIG. 3A, but it is difficult to accurately measure the temperature of the FET in the package 224 due to the thermal resistance of a mold resin of the package.

SUMMARY

The present disclosure provides some embodiments of an insulated synchronous rectification type DC/DC converter capable of more accurately measuring a temperature of a secondary side synchronous rectifying transistor.

According to one embodiment of the present disclosure, there is provided an isolated synchronous rectification type DC/DC converter. The DC/DC converter includes: a transformer including a primary winding and a secondary winding; a switching transistor connected to the primary winding of the transformer; a synchronous rectifying transistor installed between the secondary winding of the transformer and a ground line on the secondary side; a photocoupler including a light emitting device and a light receiving device; a feedback circuit configured to drive the light emitting device of the photocoupler such that an output voltage of the DC/DC converter approaches a target voltage; a primary side controller which is connected to the light receiving device of the photocoupler and switches the switching transistor depending on a feedback signal from the photocoupler; a synchronous rectification controller configured to control the synchronous rectifying transistor; and a protection circuit including a temperature detection element, one end of the temperature detection element connected to a drain of the synchronous rectifying transistor, and the protection circuit configured to detect an overheated state of the synchronous rectifying transistor depending on a first signal generated by the temperature detection element.

In this embodiment, one end of the temperature detection element and the drain of an FET in the synchronous rectifying transistor are connected via an electrical wiring. Since the thermal conductivity of the electrical wiring is higher than that of a resin of the package or a resin of a printed board, the thermal bonding of the temperature detection element and the FET in the synchronous rectifying transistor is improved. Thus, it is possible to more accurately measure a temperature of the FET in the synchronous rectifying transistor by the temperature detection element.

In some embodiments, the protection circuit may detect the overheated state of the synchronous rectifying transistor depending on a second signal corresponding to one of an average value, an integrated value, and a peak value of the first signal.

Since the drain voltage of the synchronous rectifying transistor periodically fluctuates according to the switching of the switching transistor, the first signal includes this fluctuation component. According to this protection circuit, it is possible to remove the fluctuation component and to extract a DC component dependent on the temperature by generating the second signal.

In some embodiments, the synchronous rectifying transistor may be accommodated in a surface mount package. The one end of the temperature detection element and the drain electrode of the synchronous rectifying transistor may be electrically and physically connected by a solder. This makes it possible to greatly enhance the thermal bonding.

In some embodiments, the synchronous rectifying transistor and the temperature detection element may be mounted on different surfaces of a printed board, and the one end of the temperature detection element may be connected to the drain electrode of the synchronous rectifying transistor via a via hole. Since the thermal conductivity of the via hole is sufficiently high, it is also possible to accurately measure a temperature of the synchronous rectifying transistor even by this embodiment and to increase the utilization efficiency of the printed board.

In some embodiments, the synchronous rectifying transistor and the temperature detection element may be mounted on the same surface of a printed board, and the one end of the temperature detection element may be connected to the drain electrode of the synchronous rectifying transistor via a printed wiring. When the printed wiring may be designed such that the thermal conductivity is sufficiently high, it is possible to accurately measure a temperature of the synchronous rectifying transistor.

In some embodiments, the protection circuit may drive the light emitting device of the photocoupler when detecting the overheated state. By driving the photocoupler in the overheated state, it is possible to decrease a duty ratio of switching of the primary side controller or to stop the switching.

In some embodiments, the DC/DC converter may further include a thermistor which is a temperature detection element, one end of the thermistor connected to the drain of the synchronous rectifying transistor, a first resistor installed between the other end of the thermistor and the ground line, and a smoothing capacitor installed between the other end of the thermistor and the ground line, wherein the DC/DC converter is configured to determine the overheated state based on a comparison between a voltage generated by the smoothing capacitor and a predetermined threshold voltage. It is possible to remove the fluctuation component due to the switching of the switching transistor and generate a DC voltage dependent on the temperature in the smoothing capacitor.

In some embodiments, the protection circuit may include a latch circuit which is activated when the overheat state is detected and drives the photocoupler in the active state and then automatically becomes inactivated when a potential of a cathode of the light emitting device of the photocoupler decreases. When the duty ratio of switching of the primary side controller decreases or the switching is stopped by driving the photocoupler, the output voltage of the secondary side, i.e., a potential of a cathode of the light emitting device, decreases. Further, when the latch circuit is deactivated, the switching of the primary side controller is resumed. That is, when the overheated state continues, it is possible to intermittently operate the DC/DC converter.

In some embodiments, the protection circuit may include an NPN type or N channel first transistor including a control terminal which receives the second signal, one end of the first transistor being grounded, a second resistor installed between the control terminal of the first transistor and the ground, a PNP type or P channel second transistor including a control terminal which is connected to the other end of the first transistor, one end of the second transistor being connected to the control terminal of the first transistor, and the other end being connected to the light emitting device of the photocoupler, and a third resistor installed between the control terminal of the second transistor and the light emitting device of the photocoupler.

In some embodiments, the protection circuit may include a filter configured to smooth the first signal to generate the second signal. In some embodiments, the protection circuit may include a peak hold circuit configured to peak-hold the first signal to generate the second signal. In some embodiments, the protection circuit may include an integrator configured to integrate the first signal to generate the second signal.

According to another embodiment of the present disclosure, an electronic device is provided. The electronic device includes a load, a diode rectifier circuit configured to full-wave rectify a commercial AC voltage, a smoothing capacitor configured to smooth an output voltage of the diode rectifier circuit to generate a DC input voltage, and a DC/DC converter configured to step down the DC input voltage and supply it to the load.

According to another embodiment of the present disclosure, a power adaptor is provided. The power adaptor may include a diode rectifier circuit configured to full-wave rectify a commercial AC voltage, a smoothing capacitor configured to smooth an output voltage of the diode rectifier circuit to generate a DC input voltage, and a DC/DC converter configured to step down the DC input voltage and supply it to the load.

Further, arbitrarily combining the foregoing components or substituting the components or expressions of the present disclosure with one another among a method, an apparatus, and a system is also effective as an embodiment of the present disclosure.

BRIEF DESCRIPTION OF THE DRAWINGS

FIGS. 8A and 8B are operational waveform diagrams when the gate-source of the synchronous rectifying transistor is short-circuited and it continuously operates in the secondary side circuit of FIG. 6.

FIG. 10 is a diagram illustrating an AC adapter including an AC/DC converter.

DETAILED DESCRIPTION

Figure 1:
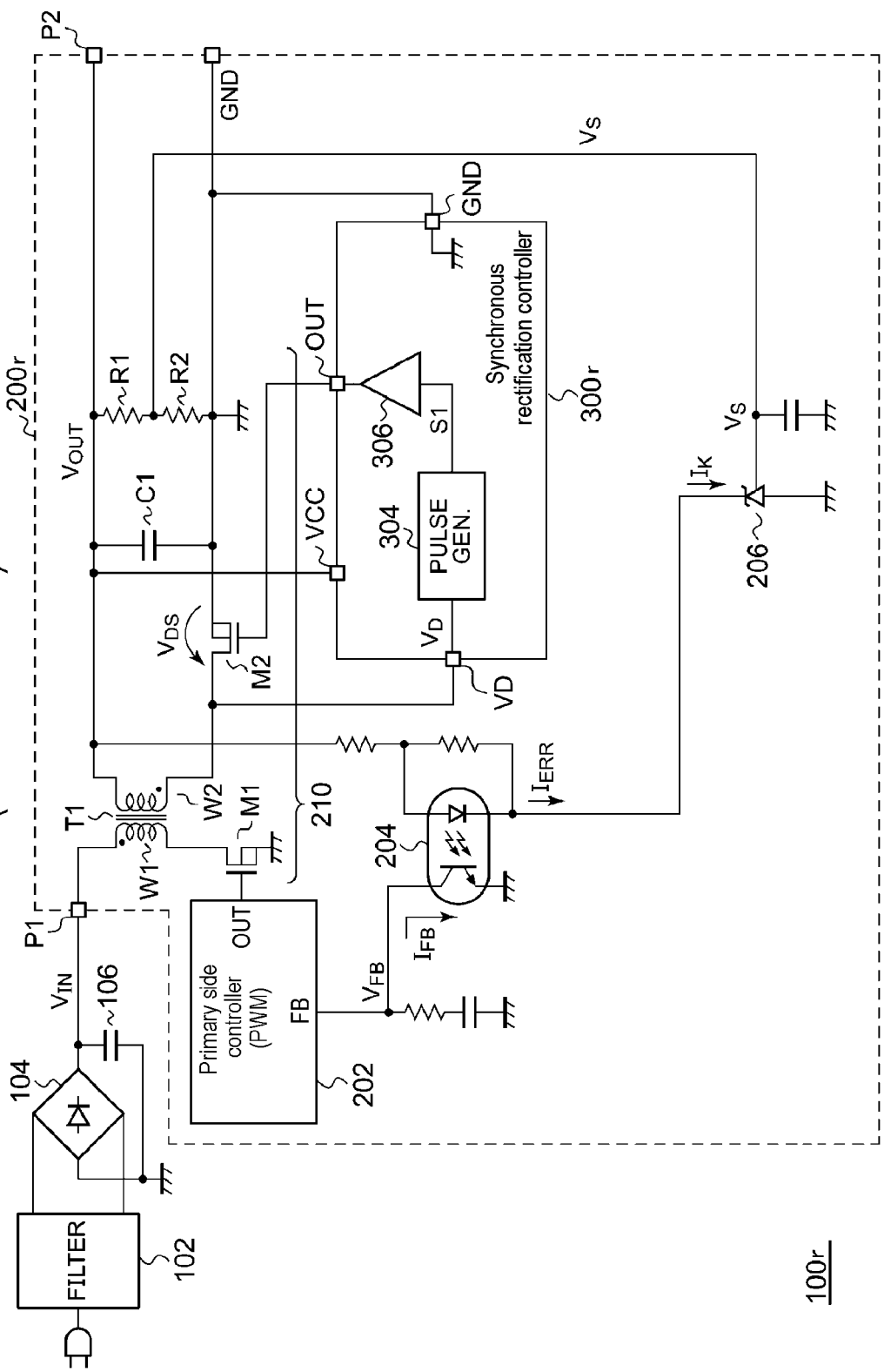
FIG. 1 is a block diagram illustrating a basic configuration of an AC/DC converter reviewed by the present inventors.
Figure 2:
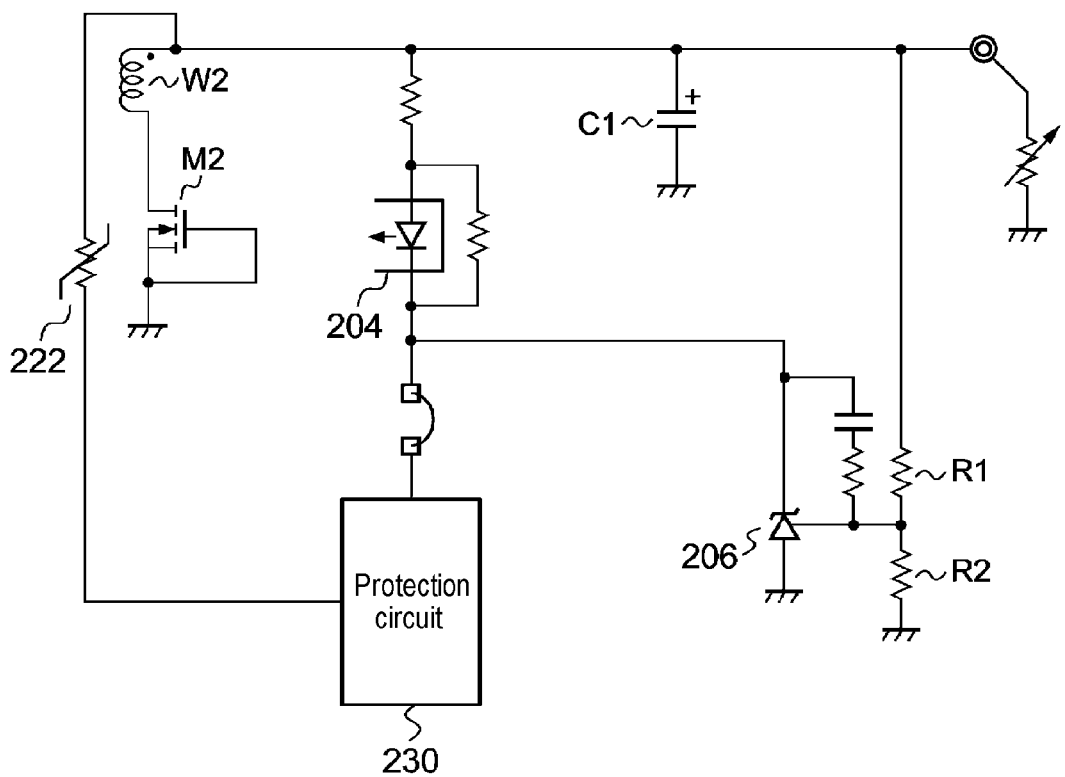
FIG. 2 is a circuit diagram of a secondary side circuit of a DC/DC converter reviewed by the present inventors.

Embodiments of the present disclosure will be now described in detail with reference to the drawings. Like or equivalent components, members, and processes illustrated in each drawing are given like reference numerals, and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function achieved by combinations of the members A and C or the members B and C, in addition to a case where the member A and the member C or the member B and the member C are directly connected.

Figure 4:
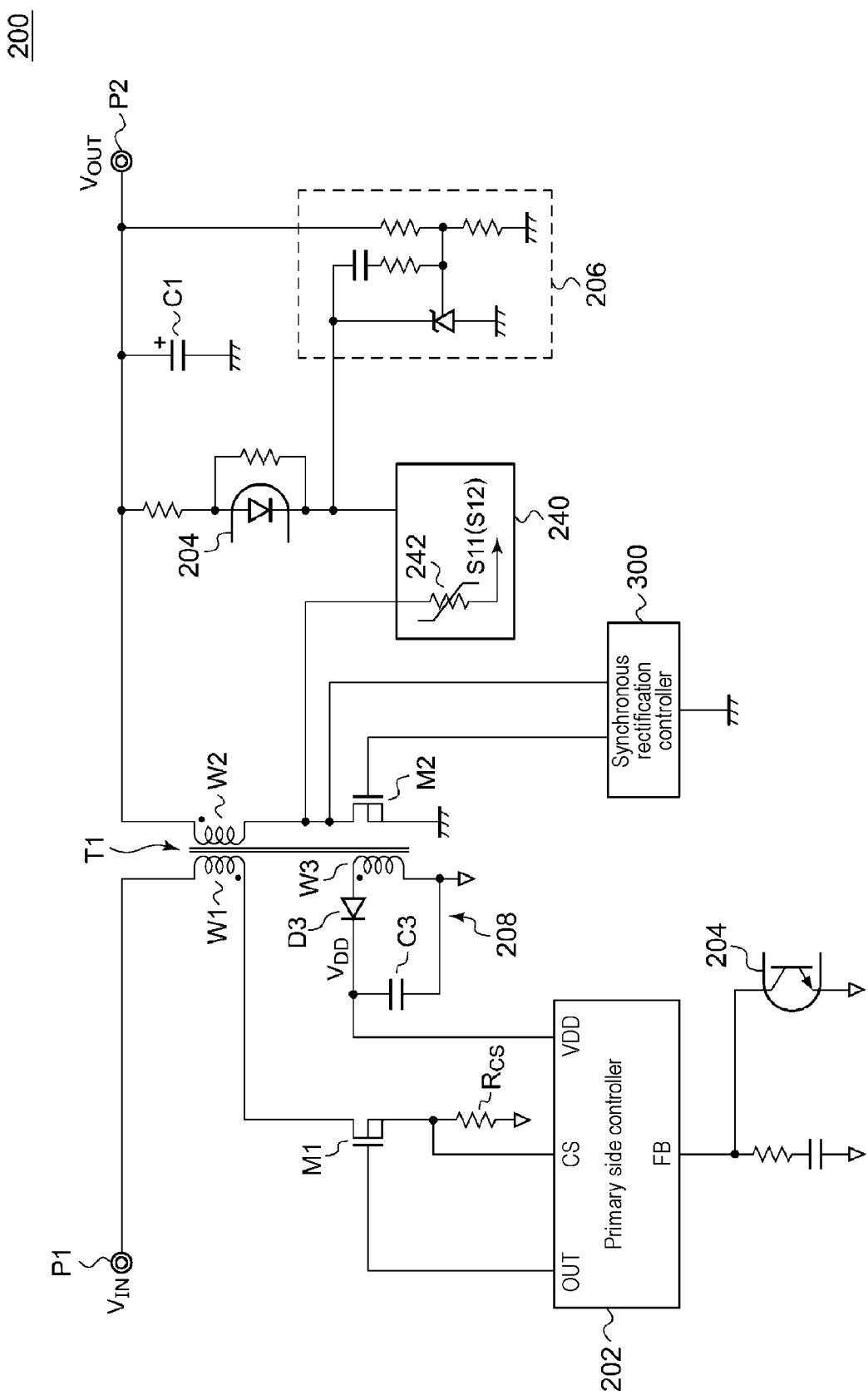
FIG. 4 is a circuit diagram of a DC/DC converter according to an embodiment of the present disclosure.

FIG. 4 is a circuit diagram of a DC/DC converter 200 according to an embodiment of the present disclosure. The DC/DC converter 200 may be used in the AC/DC converter 100$r$ of FIG. 1.

A transformer T1 includes a primary winding W1, a secondary winding W2, and an auxiliary winding W3. One end of the primary winding W1 is connected to an input terminal P1 to receive a DC input voltage $V_{IN}$. A switching transistor M1 is connected to the other end of the primary winding W1 of the transformer T1. A current detecting sense resistor $R_{CS}$ is inserted between a source and a ground line of the switching transistor M1.

A synchronous rectifying transistor M2 is installed between one end of the secondary winding W2 of the transformer T1 and a ground line of a secondary side. Further, the other end of the secondary winding W2 is connected to an output terminal P2. An output capacitor C1 is connected to the output terminal P2.

A photocoupler 204 includes a light emitting device and a light receiving device. A feedback circuit 206 drives the light emitting device of the photocoupler 204 such that an output voltage $V_{OUT}$ of the DC/DC converter 200 approaches a target value $V_{OUT(REF)}$. For example, the feedback circuit 206 may include a shunt regulator or an error amplifier.

A primary side controller 202 is connected to the light receiving device of the photocoupler 204, and switches the switching transistor M1 depending on a feedback signal $V_{FB}$ from the photocoupler 204. The auxiliary winding W3 of the transformer T1 forms a self-power supply circuit 208 together with the diode D3 and the capacitor C3 to generate a power supply voltage $V_{DD}$ of the primary side controller 202.

A synchronous rectification controller 300 controls the synchronous rectifying transistor M2. For example, the synchronous rectification controller 300 generates a control pulse based on a drain-source voltage of the synchronous rectifying transistor M2 and supplies the same to a gate of the synchronous rectifying transistor M2.

A protection circuit 230 includes a temperature detection element 242 whose one end is connected to the drain of the synchronous rectifying transistor M2, and detects an overheated state of the synchronous rectifying transistor M2 based on a first signal S11 generated by the temperature detection element 242.

Since the drain voltage of the synchronous rectifying transistor M2 periodically fluctuates according to switching of the switching transistor M1, the first signal S11 includes this fluctuation component. Thus, the protection circuit 230 may detect an overheated state of the synchronous rectifying transistor M2 depending on a second signal S12 corresponding to one of an average value, an integrated value, and a peak value of the first signal S11. This makes it possible to extract a DC component dependent on a temperature.

The above is the configuration of the DC/DC converter 200.

According to this DC/DC converter 200, one end of the temperature detection element and a drain of the FET in the synchronous rectifying transistor are connected by an electrical wiring. The electrical wiring is a metal and has thermal conductivity higher than that of a resin of a package or a resin of a printed board. Therefore, it is possible to increase thermal bonding between the temperature detection element 242 and the FET in the synchronous rectifying transistor M2 and to rapidly transmit heat from the FET in the synchronous rectifying transistor M2 to the temperature detection element 242. Thus, it is possible to accurately measure a temperature of the synchronous rectifying transistor M2 by the temperature detection element 242 with small delay.

Figure 5A:
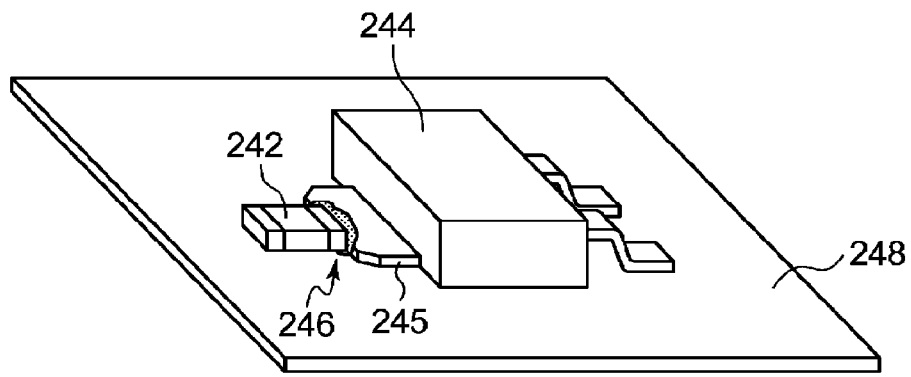
FIGS. 5A to 5C are diagrams illustrating a specific example of mounting a temperature detection element and a synchronous rectifying transistor.
Figure 5B:
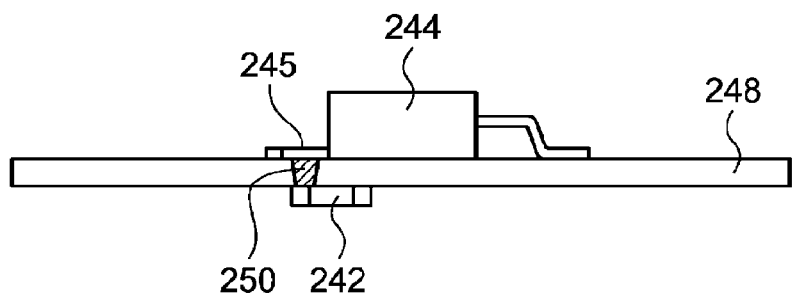
Figure 5C:
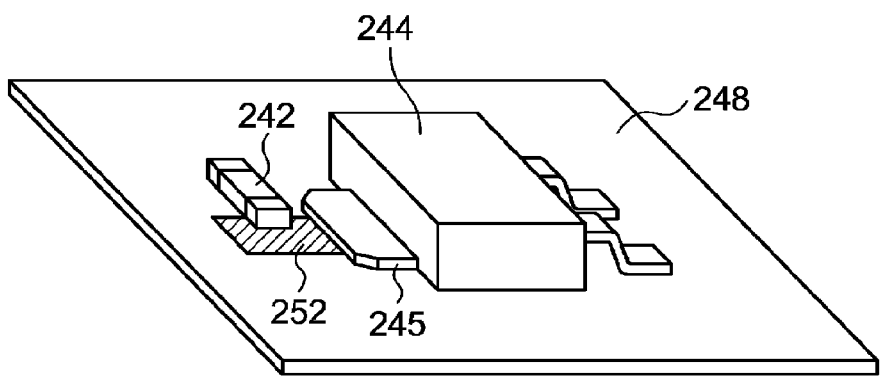

FIGS. 5A to 5C are diagrams illustrating a specific example of mounting the temperature detection element 242 and the synchronous rectifying transistor M2.

In FIG. 5A, the synchronous rectifying transistor M2 is accommodated in a surface mount type package 244. The package 244 includes a drain electrode 245. One end of the temperature detection element 242 and the drain electrode 245 of the synchronous rectifying transistor M2 are electrically and physically connected by a solder 246.

Figure 3A:
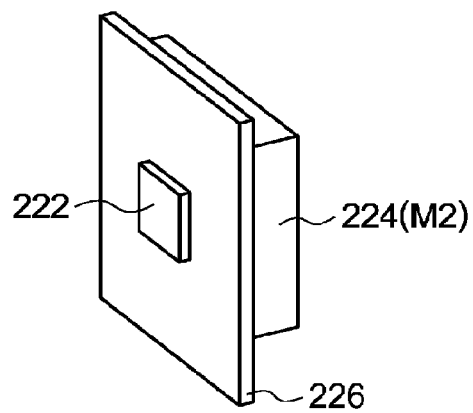
FIGS. 3A and 3B are diagrams illustrating layouts of a thermistor and a package of a synchronous rectifying transistor.
Figure 3B:
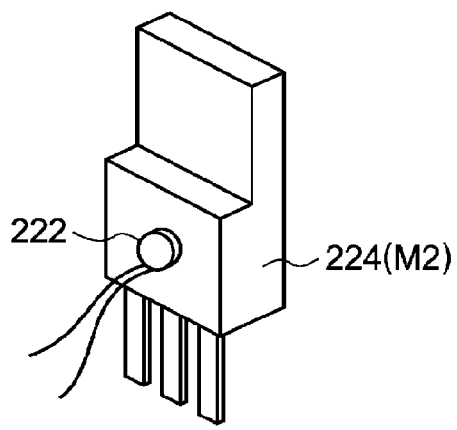
Figure 6A:
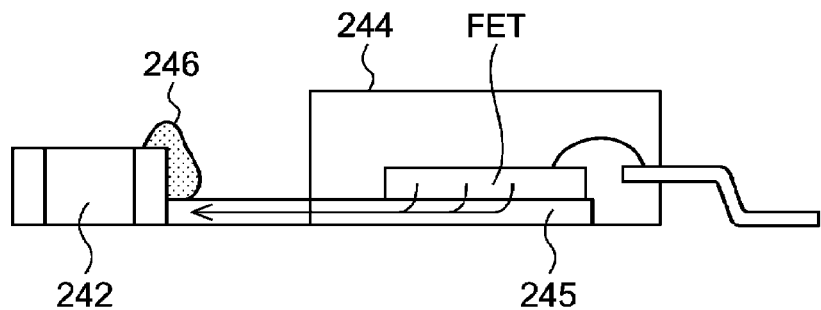
FIG. 6A is a diagram schematically illustrating thermal conduction in the mounting of FIG. 5A, and FIGS. 6B and 6C are diagrams schematically illustrating thermal conduction in the mounting of FIGS. 3A and 3B.
Figure 6B:
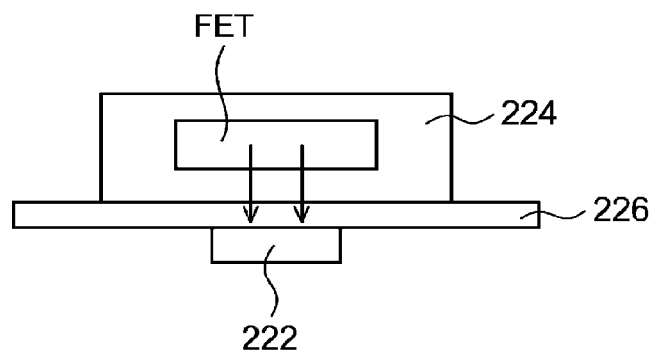
Figure 6C:
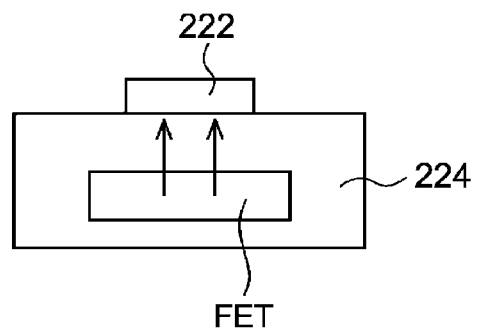

FIG. 6A is a diagram schematically illustrating thermal conduction in the mounting of FIG. 5A, and FIGS. 6B and 6C are diagrams schematically illustrating thermal conduction in the mounting of FIGS. 3A and 3B.

In order to clarify the advantages of the DC/DC converter 200 corresponding to the embodiment, first, the thermal conduction thereof will be described with reference to FIGS. 3A and 3B. In FIG. 6B, the heat from the FET element is transmitted to the thermistor 222 via a mold resin of the package 224 and the printed board 226. In FIG. 6C, the heat from the FET element is transmitted to the thermistor 222 via the mold resin of the package 224. Since the thermal conductivity of the resin of the package 224 or the printed board 226 is low, it is difficult to accurately measure a temperature of the FET element by the thermistor 222 without delay.

Referring to FIG. 6A, the heat from the FET element (semiconductor substrate) in the package 244 propagates to the temperature detection element 242 via the drain electrode 245 and a printed wiring (not shown) directly therebelow. Since the drain electrode 245 or the printed wiring is a metal, the thermal conductivity is remarkably lower than that of the resin, so that the heat from the FET is conducted to the temperature detection element 242 with low loss. Thus, according to the mounting of FIG. 5A, the temperature detection element 242 can accurately measure a temperature of the synchronous rectifying transistor M2.

In the mounting of FIG. 5B, similar to that of FIG. 3A, the synchronous rectifying transistor M2 and the temperature detection element 242 are mounted on different surfaces of the printed board 248. However, in FIG. 5B, the drain electrode 245 and a terminal of the temperature detection element 242 are electrically connected via a via hole 250. Since the via hole 250 is filled with a metal, its thermal conductivity is sufficiently higher than that of the resin. Thus, it is possible to measure a temperature of the synchronous rectifying transistor M2 with higher accuracy than that of the related art even by the mounting of FIG. 5B.

In the mounting of FIG. 5C, the synchronous rectifying transistor M2 and the temperature detection element 242 are mounted on the same surface of the printed board 248. One end of the temperature detection element 242 is connected to the drain electrode 245 of the synchronous rectifying transistor M2 via the printed wiring 252.

Since the printed wiring 252 is a metal, its thermal conductivity is sufficiently higher than that of the resin. Thus, it is possible to measure a temperature of the synchronous rectifying transistor M2 with higher accuracy than that of the related art even by the mounting of FIG. 5C.

The present disclosure is recognized by the block diagram or the circuit diagram of FIG. 4 or intended to cover various devices and circuits derived from the above description, but is not limited to the specific configuration. Hereinafter, a more specific configuration example or embodiment will be described in order to help understand and clarify the essence of the present disclosure and a circuit operation thereof, rather than to narrow the scope of the present disclosure.

Figure 7:
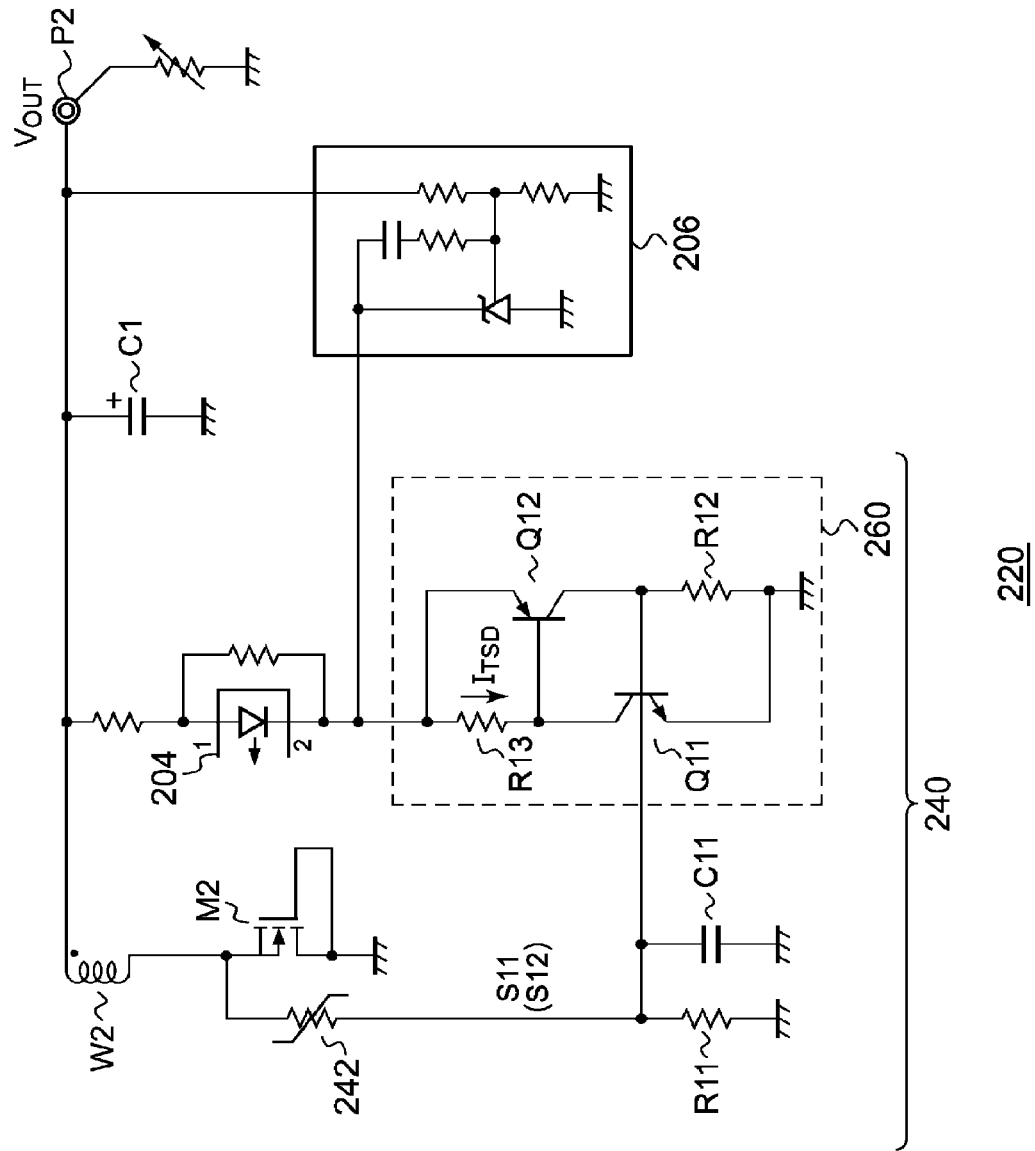
FIG. 7 is a circuit diagram illustrating a specific example of a secondary side circuit of the DC/DC converter.

FIG. 7 is a circuit diagram illustrating a specific example of the secondary side circuit 220 of the DC/DC converter 200. In this example, the temperature detection element 242 is a negative temperature coefficient (NTC) thermistor whose resistance value Rill drops as the temperature rises. A first resistor R11 is installed between the other end of the temperature detection element 242 and a ground. A smoothing capacitor C11 is installed in parallel with the first resistor R11 between the other end of the temperature detection element 242 and the ground. The temperature detection element 242, the first resistor R11, and the smoothing capacitor C11 may be recognized as constituting a low pass filter.

When an average value of the drain voltage of the synchronous rectifying transistor M2 is $V_D$, a second signal S12 may be expressed by Eq. (1) below.

$$S2 = V_D \times R_{11}/(R_{TH}+R_{11}) \quad \text{Eq. (1)}$$

Here, the average value $V_D$ of the drain voltage has a constant value corresponding to the output voltage $V_{OUT}$. As the temperature rises, the resistance value $R_{TH}$ drops and the voltage level of the second signal S12 rises. According to the protection circuit 240, it is possible to obtain the second signal S12 corresponding to a DC voltage having positive correlation with the temperature of the synchronous rectifying transistor M2. The protection circuit 240 determines an overheated state based on a result of comparison between the voltage S2 generated in the smoothing capacitor 106 and a predetermined threshold voltage.

Upon detecting the overheated state, the protection circuit 240 supplies a shutdown current $I_{TSD}$ to the light emitting device of the photocoupler 204 to drive the photocoupler 204. By driving the photocoupler 204 in the overheated state, it is possible to decrease the duty ratio of switching by the primary side controller 202 or to stop the switching.

Upon detecting the overheated state is detected, the latch circuit 260 is activated, the photocoupler 204 is driven in the active state, and thereafter, when a potential of a cathode of the light emitting device of the photocoupler 204 decreases, the latch circuit 260 is automatically deactivated.

The configuration of the latch circuit 260 is not particularly limited and includes a first transistor Q11, a second transistor Q12, a second resistor R12, and a third resistor R13.

The first transistor Q11 is an NPN type bipolar transistor whose control terminal (base) receives the second signal S12 and whose one end (emitter) is grounded. The second resistor R12 is installed between the base of the first transistor Q11 and the ground (emitter). The second transistor Q12 is a PNP type bipolar transistor whose control terminal (base) is connected to the other end (collector) of the first transistor Q11, whose one end (collector) is connected to the base of the first transistor Q11 and whose other end (emitter) is connected to the light emitting device of the photocoupler 204. The third resistor R13 is installed between the base of the second transistor Q12 and the light emitting device of the photocoupler 204. The first transistor Q11 and the second transistor Q12 may be an FET.

When a temperature of the synchronous rectifying transistor M2 rises and the second signal S12 exceeds a threshold voltage Vbe of the first transistor Q11, a collector current as a seed flows through the first transistor Q11. By this collector current, a voltage drop is generated in the third resistor R13, that is, a base-emitter voltage of the second transistor Q12 increases, the collector current of the second transistor Q12 is fed back to the second resistor R12, the base-emitter voltage of the first transistor Q11 further increases, and its collector current further increases. Once the second signal S12 exceeds the threshold voltage Vbe by this positive feedback, the latch circuit 260 is activated to supply the shutdown current $I_{TSD}$ to the photocoupler 204.

When the thermal shutdown current $I_{TSD}$ flows, the duty ratio of switching of the switching transistor M1 decreases or the switching of the switching transistor M1 is stopped. Therefore, charging from the secondary winding W2 to the output capacitor C1 is also stopped. When the output capacitor C1 is discharged by the shutdown current $I_{TSD}$, a voltage of the cathode of the photocoupler 204 decreases, which results in a loss of power supply of the latch circuit 260, makes the shutdown current $I_{TSD}$ zero, and makes the latch circuit 260 deactivated.

When the shutdown current $I_{TSD}$ becomes zero, switching of the switching transistor M1 is resumed by feedback by the feedback circuit 206. After the switching is resumed, if the synchronous rectifying transistor M2 is overheated, the latch circuit 260 is again activated.

The above is the configuration example of the protection circuit 240. Next, an operation of the protection circuit 240 will be described.

FIGS. 8A and 8B are operational waveform diagrams when the gate-source of the synchronous rectifying transistor M2 is short-circuited and it continuously operates in the secondary side circuit 220 of FIG. 6. FIG. 8A illustrates the first signal S11, i.e., a temperature waveform, after 1 minute, and FIG. 8B illustrates the first signal S11, i.e., the temperature waveform, after 60 minutes. A surface temperature of the package after 1 minute was 118 degrees C. and a surface temperature of the package after 60 minutes was 112 degrees C.

In the circuit where the protection circuit 240 is omitted for the purpose of comparison, a surface temperature of the package when the gate-source of the synchronous rectifying transistor M2 was short-circuited and the circuit continuously operates for two hours in the diode rectifier mode was 168 degrees C.

As described above, according to the protection circuit 240 of FIG. 6, it is possible to accurately measure a temperature of the synchronous rectifying transistor M2. Further, when an overheated state continues, it is possible to intermittently operate the DC/DC converter 200 and to protect the circuit.

The present disclosure has been described above based on the embodiments. It is to be understood by those skilled in the art that the embodiments are merely illustrative and may be differently modified by any combination of the components or processes, and the modifications are also within the scope of the present disclosure. Hereinafter, these modifications will be described.

First Modification

Figure 9A:
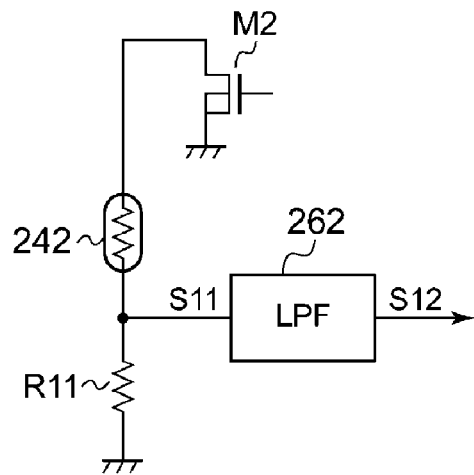
FIGS. 9A to 9C are circuit diagrams illustrating a modification of a protection circuit 240.
Figure 9B:
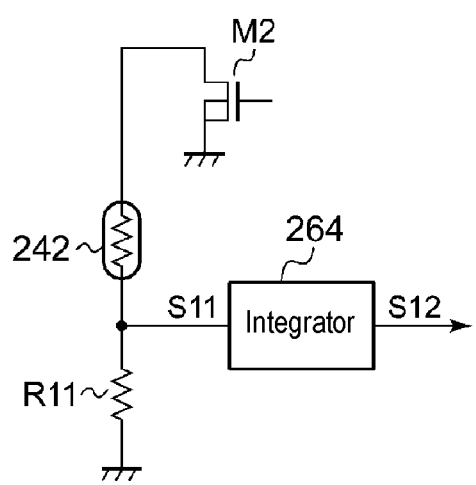
Figure 9C:
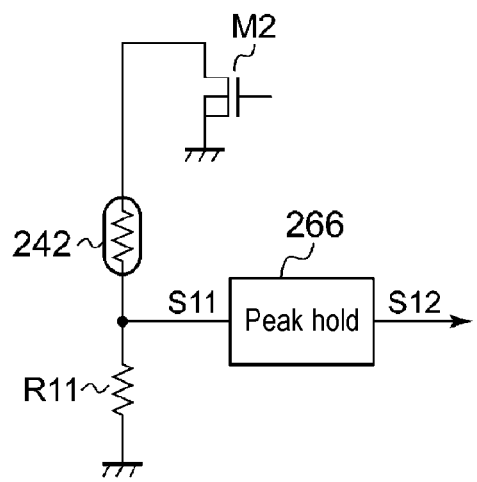

FIGS. 9A to 9C are circuit diagrams illustrating a modification of the protection circuit 240. A protection circuit 240a of FIG. 9A includes a low pass filter 262 for smoothing a first signal S11 to generate a second signal S12. A protection circuit 240b of FIG. 9B includes an integrator 264 for integrating a first signal S11 to generate a second signal S12. A protection circuit 240c of FIG. 9C includes a peak hold circuit 266 for peak-holding a first signal S11 to generate a second signal S12.

Second Modification

As the temperature detection element 242, a positive temperature coefficient (PTC) thermistor or a thermocouple, in addition to the NTC thermistor, may be used.

Third Modification

A protection method in an overheated state by the protection circuit 240 is not particularly limited. For example, when the overheated state is detected, the protection circuit 240 detects may drive a photocoupler for error notification installed separately from the photocoupler 204 to notify the primary side controller 202 of the overheated state. Upon receipt of the notification, the primary side controller 202 may stop switching of the switching transistor M1.

Fourth Modification

A protection method in an overheated state by the protection circuit 240 is not particularly limited. For example, when the overheated state is detected, the protection circuit 240 may drive a photocoupler for error notification installed separately from the photocoupler 204 to notify the primary side controller 202 of the overheated state. Upon receipt of the notification, the primary side controller 202 may stop switching of the switching transistor M1.

Fifth Modification

The configuration of the protection circuit 240 for determining an overheated state based on the second signal S12 is also not particularly limited. For example, the protection circuit 240 may include a voltage comparator for comparing the second signal S12 with a threshold voltage, and a latch circuit for latching an output of the voltage comparator.

Applications

Next, applications of the DC/DC converter 200 mentioned in the embodiments will be described. FIG. 10 is a diagram illustrating an AC adapter 800 including the AC/DC converter 100. The AC adapter 800 includes a plug 802, a housing 804, and a connector 806. The plug 802 receives a commercial AC voltage $V_{AC}$ from an outlet (not shown). The AC/DC converter 100 is mounted in the housing 804. A DC output voltage $V_{OUT}$ generated by the AC/DC converter 100 is supplied from the connector 806 to the electronic device 810. Examples of the electronic device 810 include a notebook PC, a digital camera, a digital video camera, a mobile phone, a portable audio player, and the like.

Figure 11A:
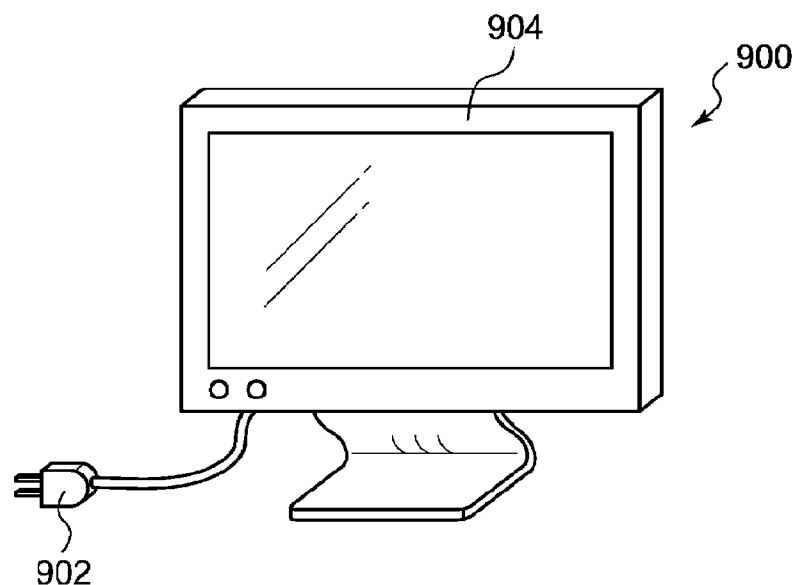
FIGS. 11A and 11B are diagrams illustrating an electronic device including an AC/DC converter.
Figure 11B:
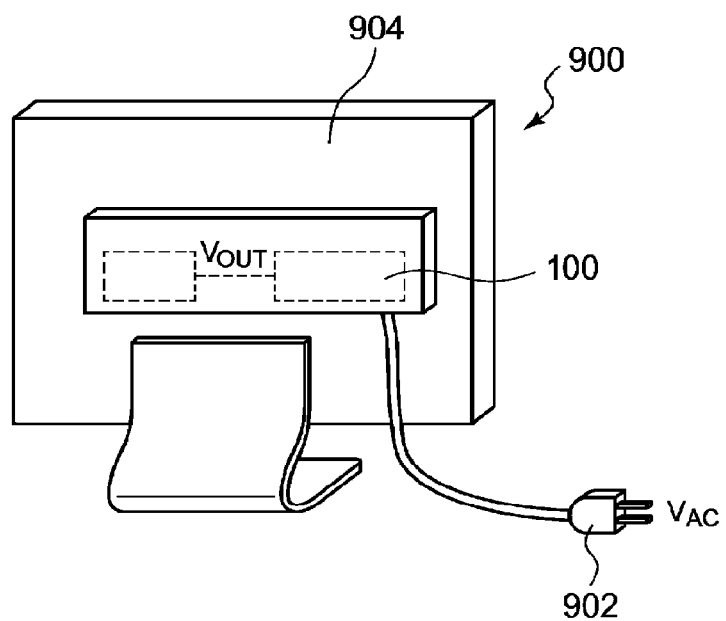

FIGS. 11A and 11B are diagrams illustrating an electronic device 900 including the AC/DC converter 100. The electronic device 900 in FIGS. 11A and 11B is a display device, but the type of the electronic device 900 is not particularly limited thereto, and it may be a device that incorporates a power supply device, such as an audio device, a refrigerator, a washing machine, a vacuum cleaner, or the like.

The plug 902 receives a commercial AC voltage $V_{AC}$ from an outlet (not shown). The AC/DC converter 100 is mounted in a housing 904. A DC output voltage $V_{OUT}$ generated by the AC/DC converter 100 is supplied to a load, such as a microcomputer, a digital signal processor (DSP), a power supply circuit, a lighting device, an analog circuit, a digital circuit, or the like, which is mounted in the same housing 904.

According to the present disclosure in some embodiments, it is possible to accurately measure a temperature of a synchronous rectifying transistor.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An isolated synchronous rectification type DC/DC converter, comprising:
   a transformer including a primary winding and a secondary winding;
   a switching transistor connected to the primary winding of the transformer;
   a synchronous rectifying transistor installed between the secondary winding of the transformer and a ground line on the secondary side;
   a photocoupler including a light emitting device and a light receiving device;
   a feedback circuit configured to drive the light emitting device of the photocoupler such that an output voltage of the DC/DC converter approaches a target voltage;
   a primary side controller which is connected to the light receiving device of the photocoupler and switches the switching transistor depending on a feedback signal from the photocoupler;
   a synchronous rectification controller configured to control the synchronous rectifying transistor; and
   a protection circuit including a temperature detection element configured to detect a temperature of the synchronous rectifying transistor and generate a first signal according to the detected temperature, one end of the temperature detection element connected to a drain of the synchronous rectifying transistor, the protection circuit configured to detect an overheated state of the synchronous rectifying transistor depending on the first signal.

2. The DC/DC converter of claim 1, wherein the protection circuit is configured to detect the overheated state of the synchronous rectifying transistor depending on a second signal corresponding to one of an average value, an integrated value, and a peak value of the first signal.

3. The DC/DC converter of claim 1, wherein the synchronous rectifying transistor is accommodated in a surface mount package, and
   the one end of the temperature detection element and the drain electrode of the synchronous rectifying transistor are electrically and physically connected by a solder.

4. The DC/DC converter of claim 1, wherein the synchronous rectifying transistor and the temperature detection element are mounted on different surfaces of a printed board, and
   the one end of the temperature detection element is connected to the drain electrode of the synchronous rectifying transistor via a via hole.

5. The DC/DC converter of claim 1, wherein the synchronous rectifying transistor and the temperature detection element are mounted on the same surface of a printed board, and
   the one end of the temperature detection element is connected to the drain electrode of the synchronous rectifying transistor via a printed wiring.

6. The DC/DC converter of claim 1, wherein the protection circuit is configured to drive the light emitting device of the photocoupler when detecting the overheated state.

7. The DC/DC converter of claim 1, further comprising:
   a thermistor which is a temperature detection element, one end of the thermistor connected to the drain of the synchronous rectifying transistor;
   a first resistor installed between the other end of the thermistor and the ground line; and
   a smoothing capacitor installed between the other end of the thermistor and the ground line, wherein the DC/DC converter is configured to determine the overheated state based on a comparison between a voltage generated by the smoothing capacitor and a predetermined threshold voltage.

8. The DC/DC converter of claim 1, wherein the protection circuit comprises:
a latch circuit which is activated when the overheat state is detected and drives the photocoupler in the activated state and then automatically becomes inactivated when a potential of a cathode of the light emitting device of the photocoupler decreases.

9. The DC/DC converter of claim 2, wherein the protection circuit comprises:
an NPN type or N channel first transistor including a control terminal which receives the second signal, one end of the first transistor being grounded;
a second resistor installed between the control terminal of the first transistor and the ground;
a PNP type or P channel second transistor including a control terminal which is connected to the other end of the first transistor, one end of the second transistor being connected to the control terminal of the first transistor, and the other end being connected to the light emitting device of the photocoupler; and
a third resistor installed between the control terminal of the second transistor and the light emitting device of the photocoupler.

10. The DC/DC converter of claim 2, wherein the protection circuit comprises a filter configured to smooth the first signal to generate the second signal.

11. The DC/DC converter of claim 2, wherein the protection circuit comprises a peak hold circuit configured to peak-hold the first signal to generate the second signal.

12. The DC/DC converter of claim 2, wherein the protection circuit comprises an integrator configured to integrate the first signal to generate the second signal.

13. An electronic device, comprising:
a load;
a diode rectifier circuit configured to full-wave rectify a commercial AC voltage;
a smoothing capacitor configured to smooth an output voltage of the diode rectifier circuit to generate a DC input voltage; and
the DC/DC converter of claim 1, configured to step down the DC input voltage and supply it to the load.

14. A power adaptor, comprising:
a diode rectifier circuit configured to full-wave rectify a commercial AC voltage;
a smoothing capacitor configured to smooth an output voltage of the diode rectifier circuit to generate a DC input voltage; and
the DC/DC converter of claim 1, configured to step down the DC input voltage and supply it to the load.

15. An isolated synchronous rectification type DC/DC converter, comprising:
a transformer including a primary winding and a secondary winding;
a switching transistor connected to the primary winding of the transformer;
a synchronous rectifying transistor installed between the secondary winding of the transformer and a ground line on the secondary side;
a photocoupler including a light emitting device and a light receiving device;
a feedback circuit configured to drive the light emitting device of the photocoupler such that an output voltage of the DC/DC converter approaches a target voltage;
a primary side controller which is connected to the light receiving device of the photocoupler and switches the switching transistor depending on a feedback signal from the photocoupler;
a synchronous rectification controller configured to control the synchronous rectifying transistor; and
a protection circuit including a temperature detection element, one end of the temperature detection element connected to a drain of the synchronous rectifying transistor, the protection circuit configured to detect an overheated state of the synchronous rectifying transistor depending on a first signal generated by the temperature detection element,
wherein the synchronous rectifying transistor is accommodated in a surface mount package, and
the one end of the temperature detection element and the drain electrode of the synchronous rectifying transistor are electrically and physically connected by a solder.

16. The DC/DC converter of claim 15, wherein the protection circuit is configured to detect the overheated state of the synchronous rectifying transistor depending on a second signal corresponding to one of an average value, an integrated value, and a peak value of the first signal.

17. An isolated synchronous rectification type DC/DC converter, comprising:
a transformer including a primary winding and a secondary winding;
a switching transistor connected to the primary winding of the transformer;
a synchronous rectifying transistor installed between the secondary winding of the transformer and a ground line on the secondary side;
a photocoupler including a light emitting device and a light receiving device;
a feedback circuit configured to drive the light emitting device of the photocoupler such that an output voltage of the DC/DC converter approaches a target voltage;
a primary side controller which is connected to the light receiving device of the photocoupler and switches the switching transistor depending on a feedback signal from the photocoupler;
a synchronous rectification controller configured to control the synchronous rectifying transistor; and
a protection circuit including a temperature detection element, one end of the temperature detection element connected to a drain of the synchronous rectifying transistor, the protection circuit configured to detect an overheated state of the synchronous rectifying transistor depending on a first signal generated by the temperature detection element, wherein the synchronous rectifying transistor and the temperature detection element are mounted on different surfaces of a printed board, and
the one end of the temperature detection element is connected to the drain electrode of the synchronous rectifying transistor via a via hole.

18. The DC/DC converter of claim 17, wherein the protection circuit is configured to detect the overheated state of the synchronous rectifying transistor depending on a second signal corresponding to one of an average value, an integrated value, and a peak value of the first signal.

* * * * *